United States Patent
Iwata

(10) Patent No.: US 10,596,855 B2
(45) Date of Patent: Mar. 24, 2020

(54) TIRE

(71) Applicant: Sumitomo Rubber Industries, Ltd., Kobe-shi, Hyogo (JP)

(72) Inventor: Yasutaka Iwata, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 488 days.

(21) Appl. No.: 15/406,008

(22) Filed: Jan. 13, 2017

(65) Prior Publication Data

US 2017/0225514 A1 Aug. 10, 2017

(30) Foreign Application Priority Data

Feb. 4, 2016 (JP) ................................ 2016-020064

(51) Int. Cl.
*B60C 11/03* (2006.01)
*B60C 11/11* (2006.01)

(52) U.S. Cl.
CPC .......... *B60C 11/0306* (2013.01); *B60C 11/11* (2013.01); *B60C 2011/0346* (2013.01); *B60C 2011/0353* (2013.01); *B60C 2011/0365* (2013.01); *B60C 2011/0372* (2013.01); *B60C 2011/0381* (2013.01); *B60C 2011/0383* (2013.01)

(58) Field of Classification Search
CPC ............. B60C 11/0306; B60C 11/0309; B60C 2011/0346; B60C 2011/0372; B60C 2011/0365; B60C 2011/0353; B60C 11/11
See application file for complete search history.

(56) References Cited

U.S. PATENT DOCUMENTS

2012/0267022 A1 10/2012 Tagashira
2014/0238567 A1* 8/2014 Iwasaki ............... B60C 11/0306
152/209.18
2017/0197473 A1* 7/2017 Kurosawa ........... B60C 11/0306

FOREIGN PATENT DOCUMENTS

CN 102887039 A * 1/2013 ............ B60C 11/13
DE 2127469 A1 * 12/1972 ............ B60C 11/01
(Continued)

OTHER PUBLICATIONS

Machine translation of CN 102887039 (no date).*
Machine translation of DE 2127469 (no date).*
Machine translation of JP08-025914 (no date).*

*Primary Examiner* — Steven D Maki
*Assistant Examiner* — Philip N Schwartz
(74) *Attorney, Agent, or Firm* — Birch, Stewart, Kolasch & Birch, LLP

(57) ABSTRACT

A tire includes a tread portion provided with a first main groove disposed between the tire equator and a tread edge and extending continuously in the tire circumferential direction; outward transverse grooves extending axially outwardly from the first main groove; and inward transverse grooves extending axially inwardly from the first main groove. The first main groove is a zigzag groove including axially outer segments extending along the tire circumferential direction; axially inner segments extending along the tire circumferential direction and positioned axially inside the axially outer segments; and oblique segments linking therebetween. Each of the axially outer segments is connected with one of the outward transverse grooves and one of the inward transverse grooves.

9 Claims, 7 Drawing Sheets

(56) References Cited

FOREIGN PATENT DOCUMENTS

| JP | 08025914 A | * | 1/1996 | ......... B60C 11/0318 |
| JP | 2012-224245 A | | 11/2012 | |

* cited by examiner

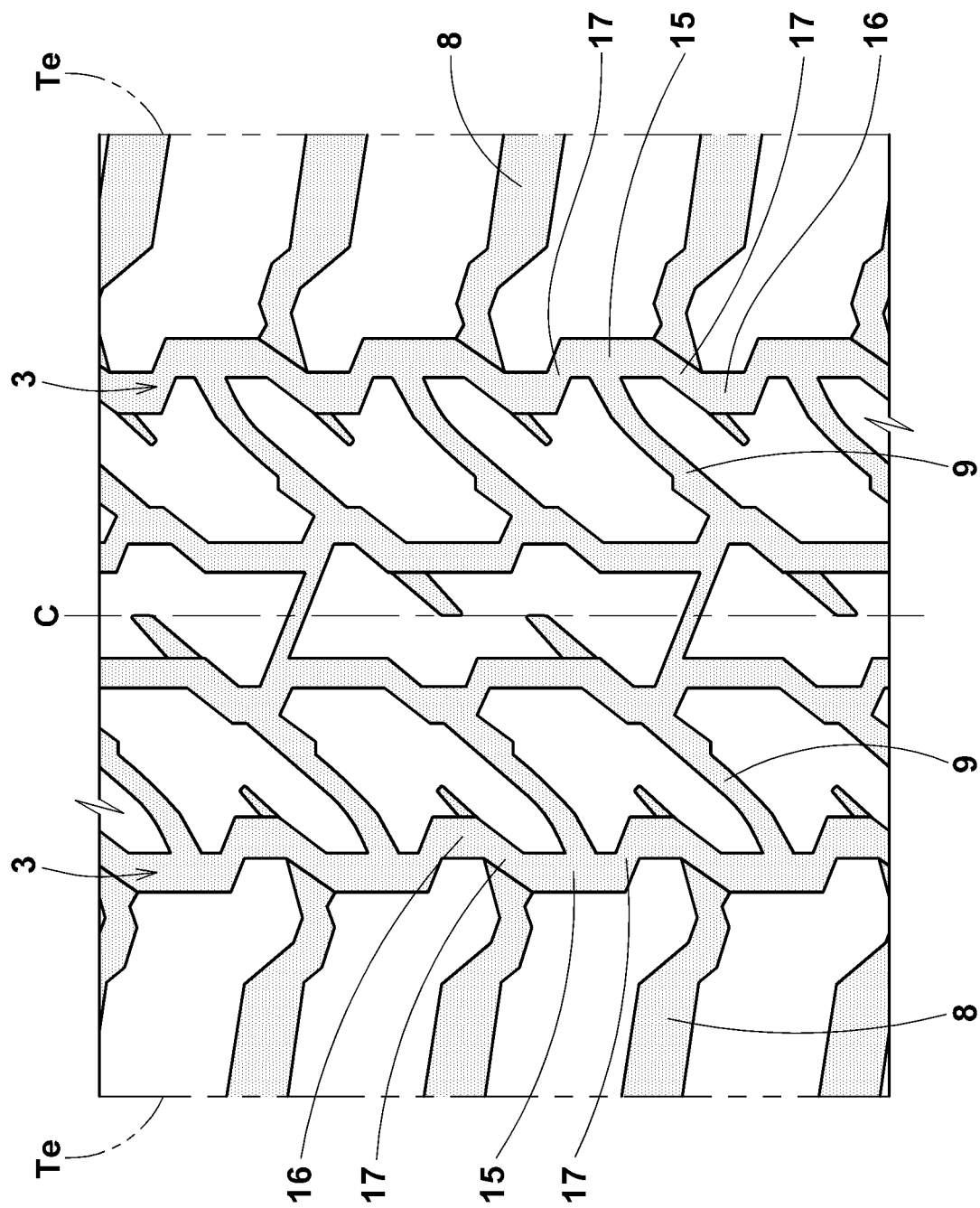

TIRE

TECHNICAL FIELD

The present invention relates to a tire having excellent on-the-snow traction performance, noise performance and uneven wear resistance.

BACKGROUND ART

There has been known a tire provided in the tread portion with a plurality of main grooves continuously extending in the tire circumferential direction, and transverse grooves extending in the tire axial direction from the main grooves, and thereby provided with a block pattern. when running on snowy roads, the transverse grooves shear snow blocks compacted thereinto to generate shearing force, and thereby, such tire is provided with on-the-snow performance such as traction or driving performance and braking performance. By increasing the volume of such transverse grooves, the shearing force of the compacted snow blocks is increased, and on-the-snow performance can be improved. At the same time, the transverse grooves increased in the volume tend to generate loud noise (e.g. pumping sound) when contacting with and leaving from road surface. Further, the land regions or blocks are decreased in the rigidity, and as a result, uneven wear such as heel-and-toe wear becomes liable to occur. Thus, noise performance and uneven wear resistance are contradictory to on-the-snow performance, and it was difficult to improve these performances in good balance.

Prior art document: Japanese Patent Application Publication No. 2012-224245

SUMMARY OF THE INVENTION

It is therefore, an object of the present invention to provide a tire in which on-the-snow traction performance, noise performance and uneven wear resistance can be improved in good balance.

According to the present invention, a tire comprises a tread portion provided with
a first main groove disposed between the tire equator and one of the tread edges and extending continuously in the tire circumferential direction,
a plurality of outward transverse grooves extending axially outwardly from the first main groove, and
a plurality of inward transverse grooves extending axially inwardly from the first main groove, wherein
the first main groove is a zigzag groove comprising a plurality of axially outer segments extending along the tire circumferential direction,
a plurality of axially inner segments extending along the tire circumferential direction and positioned axially inside the axially outer segments, and
a plurality of oblique segments linking the axially outer segments and the axially inner segments and inclined with respect to the tire circumferential direction, and
each of the axially outer segments is connected with one of the outward transverse grooves and one of the inward transverse grooves.

In the tire according to the present invention, it is preferable that each of the outward transverse grooves is connected to one of the axially outer segments so as to include one end of the axially outer segment, and
each of the inward transverse grooves is connected to one of the axially outer segments so as to include neither one end nor the other end of the axially outer segment.

In the tire according to the present invention, it is preferable that, in the tire circumferential direction, the axially inner ends of the outward transverse grooves opened to the first main groove are respectively overlapped with the axially outer ends of the inward transverse grooves opened to the same first main groove.

In the tire according to the present invention, it is preferable that the groove width of the inward transverse groove at the axially outer end is less than the groove width of the outward transverse groove at the axially inner end.

In the tire according to the present invention, it is preferable that the outward transverse grooves are inclined oppositely to the inward transverse grooves, so that an intersecting angle between the outward transverse groove and the inward transverse groove is 120 to 140 degrees.

In the tire according to the present invention, it is preferable that the first main groove is the axially outermost groove which extends continuously in the tire circumferential direction, and
the center line of the amplitude of zigzag of the first main groove is at a position of from 22.5% to 27.5% of the tread width from the tire equator.

In the tire according to the present invention, it is preferable that the peak-to-peak amplitude of zigzag of the first main groove is in a range from 70% to 90% of the maximum groove width of the first main groove.

In the tire according to the present invention, it is preferable that the tread portion is provided on the axially inside of the first main groove with a second main groove extending continuously in the tire circumferential direction,
the axially inner ends of the inward transverse grooves are connected to the second main groove,
the outward transverse grooves extend to the tread edge, and
the outward transverse grooves and the inward transverse grooves are not connected to axially inner segments of the second main groove.

BRIEF DESCRIPTION OF THE DRAWINGS

FIG. 7 is a developed partial view of the tread portion of comparative example 2 used in the undermentioned comparison tests.

DESCRIPTION OF THE PREFERRED EMBODIMENTS

Embodiments of the present invention will now be described in detail in conjunction with the accompanying drawings.

The present invention can be applied to various tires including pneumatic tires such as passenger car tires and heavy duty tires as well as non-pneumatic tires not having a cavity to be pressurized.

Figure 1:
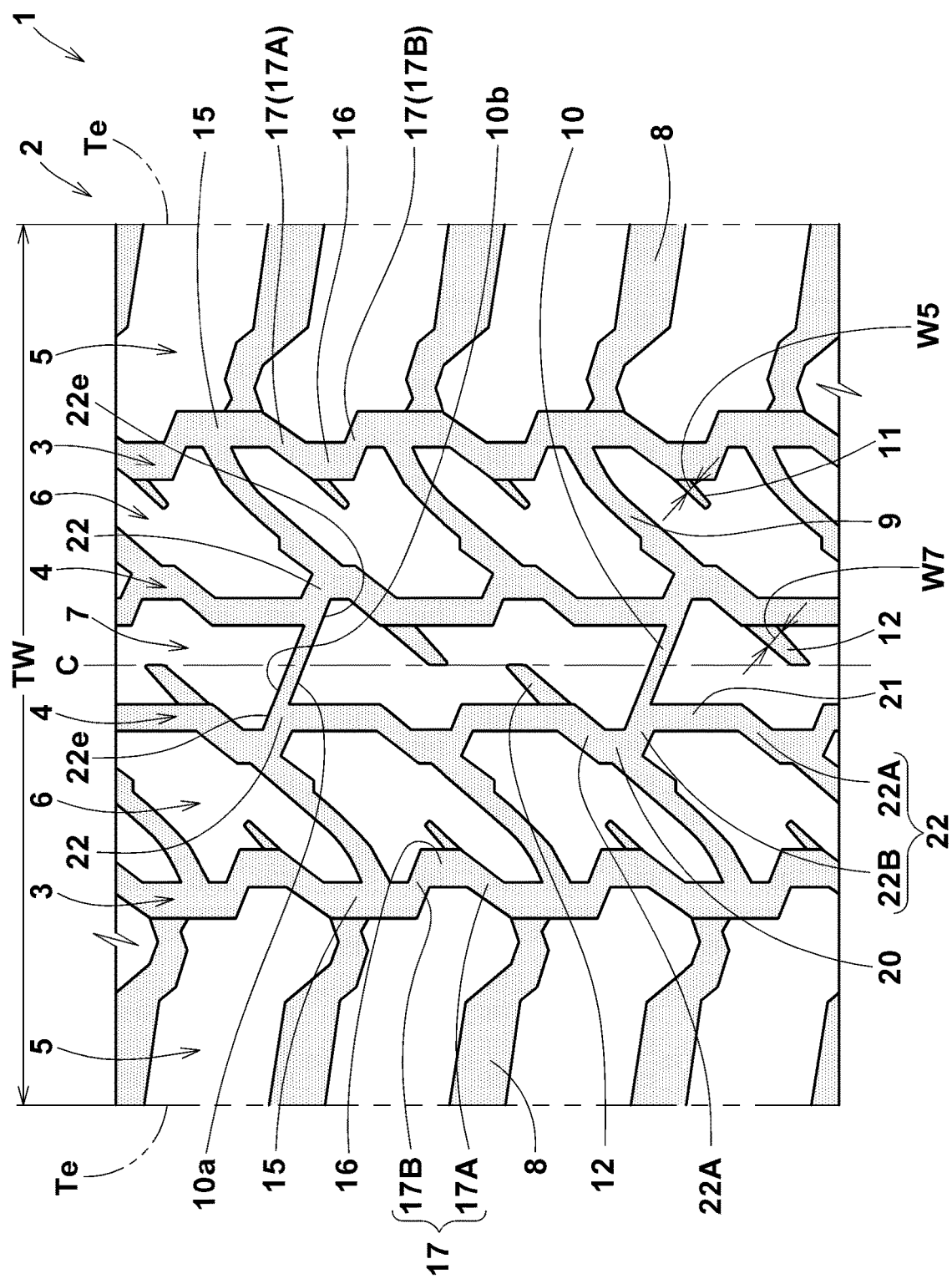
FIG. 1 is a developed partial view of the tread portion of a tire as an embodiment of the present invention.

FIG. 1 shows a tread portion 2 of a tire 1 as an embodiment of the present invention which is a pneumatic tire for passenger cars.

In this embodiment, the tread portion 2 is provided with a first main groove 3 disposed between the tire equator C and one of the tread edges Te and extending continuously in the tire circumferential direction, and
a second main groove 4 disposed the axially inside of the first main groove 3 and extending continuously in the tire circumferential direction.

The axially outer first main groove 3 and the axially inner second main groove 4 in this embodiment are disposed on each side of the tire equator c.

The first main grooves 3 in this embodiment are the axially outermost main grooves which extend continuously in the tire circumferential direction.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard pressure and standard tire load are uniformly defined by 180 kPa and 88% of the maximum tire load, respectively.

The tread edges Te are the axial outermost edges of the ground contacting patch which occurs under the normally inflated loaded condition when the camber angle of the tire is zero.

The tread width TW is the width measured under the normally inflated unloaded condition, as the axial distance between the tread edges Te determined as above.

Figure 2:
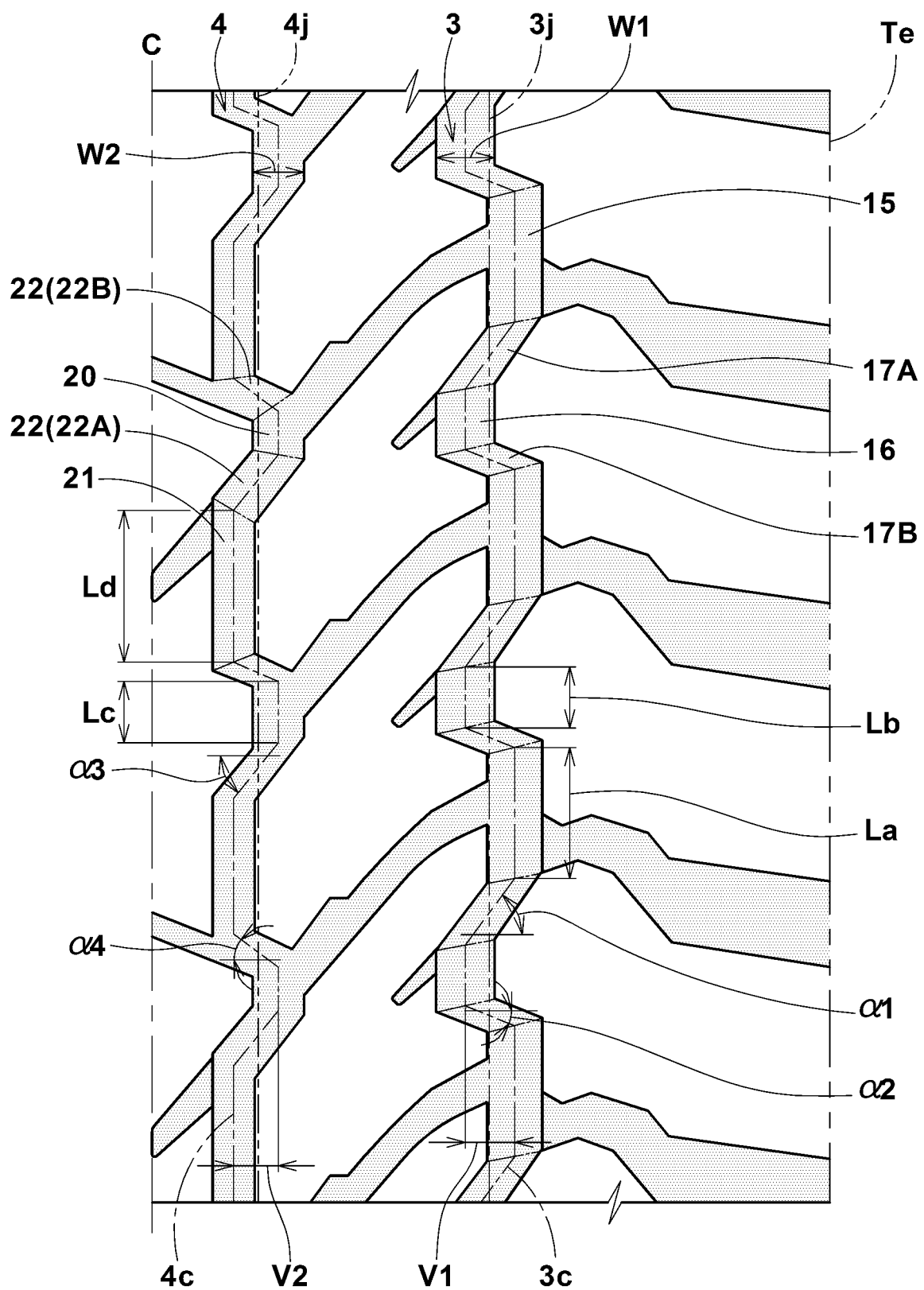
FIGS. 2 and 3 are the same closeup of a shoulder land portion and a middle land portion shown in FIG. 1 which are differently provided with reference numbers.

As shown in FIG. 2, the first main groove 3 comprises alternately arranged axially outer segments 15 and axially inner segments 16 and oblique segments 17 therebetween and is formed in the form of a zigzag.

The axially outer segments 15 and the axially inner segments 16 each extend along the tire circumferential direction. Such axially outer segments 15 and axially inner segments 16 increase the rigidity of land regions on both sides thereof and improve the uneven wear resistance.

In this embodiment, the axially outer segments 15 and the axially inner segments 16 each extend straight. Thereby, the above-mentioned function is effectively exerted.

In this specification, the expression "a groove extends along the tire circumferential direction" means that the angle of the widthwise center line of the groove with respect to the tire circumferential direction is not more than 5 degrees.

In this embodiment, the circumferential length Lb of the axially inner segment 16 is different from the circumferential length La of the axially outer segment 15. Thereby, resonance sound generated by the axially outer segments 15 and the axially inner segments 16 is prevented from increasing, and the noise performance is maintained. In order to effectively derive such effect, it is preferred that the absolute value |La−Lb| of the difference between the circumferential length Lb of the axially inner segment 16 and the circumferential length La of the axially outer segment 15 is in a set in a range from 1.1 to 1.5 times the maximum groove width W1 of the first main groove 3. In this specification, the maximum groove width W1 of the first main groove 3 is the axial width measured the axially outer segments 15 and the axially inner segments 16 extending along the tire circumferential direction.

The oblique segments 17 connect between the axially outer segments 15 and the axially inner segments 16 and are inclined with respect to the tire circumferential direction. Such oblique segments 17 effectively disturb and reduce air resonance vibration generated in the first main groove 3. Further, the edges of the oblique segments 17 have an axial component, and exert a shearing force of compacted snow. Accordingly, the oblique segments 17 can improve the noise performance and the on-the-snow traction performance.

The oblique segments 17 include first oblique segments 17A and second oblique segments 17B which are alternate in the tire circumferential direction.

The first oblique segments 17A are inclined with respect to the tire circumferential direction to one direction (in FIG. 2, slope down to the left).

The second oblique segments 17B are inclined with respect to the tire circumferential direction to an opposite direction to the first oblique segments 17A (in FIG. 2, slope down to the right).

In this embodiment, the first oblique segments 17A have an angle α1 with respect to the tire circumferential direction, and the second oblique segments 17B have an angle α2 with respect to the tire circumferential direction which is different from the angle α1.

In such oblique segments 17, the first oblique segments 17A having the smaller angle with respect to the tire circumferential direction maintain higher rigidity of the land regions in the vicinities thereof, and at the same time, the second oblique segments 17B having the larger angle with respect to the tire circumferential direction effectively reduce the air resonance sound. Therefore, the uneven wear resistance and noise performance are further improved. In order to effectively derive such function, it is preferred that the difference between the angle α1 of the first oblique segment 17A and the angle α2 of the second oblique segment 17B is in a range from 10 to 30 degrees.

It is preferable that the peak-to-peak amplitude vi of zigzag of the first main groove 3 is in a range from 70% to 90% of the maximum groove width W1 of the first main groove 3. If the amplitude V1 is less than 70% of the maximum groove width W1, there is a possibility that the on-the-snow traction performance is deteriorated. If the amplitude vi is more than 90% of the maximum groove width W1, the land regions adjacent to the oblique segments 17 of the first main groove 3 are decreased in the rigidity, and there is a possibility that the uneven wear resistance is deteriorated.

In this specification, the amplitude V1 is of the widthwise center line 3c of the first main groove 3.

It is preferable that the center line 3j of the amplitude V1 of zigzag of the first main groove 3 is at a position of from 22.5% to 27.5% of the tread width TW from the tire equator c.

If the center line 3j is located at a position of more than 27.5% of the tread width TW from the tire equator C, the ground pressure around the oblique segments 17 is decreased, and there is a possibility that the shearing force of compacted snow is decreased.

If the center line 3j is located at a position of less than 22.5% the tread width TW from the tire equator C, the difference in the rigidity between the land region on the axially inside of the first main groove 3 and the land region on the axially outside of the first main groove 3 is increased, and there is a possibility that the uneven wear resistance is deteriorated.

It is preferable that the maximum groove width W1 of the first main groove 3 set in a range from 2.5% to 6.5% of the tread width TW. Thereby, the air resonance can be effectively suppressed, while exerting a large shearing force of compacted snow.

Further, it is preferable that the groove depth of the first main groove 3 is set in a range from 9.4 to about 15.0 mm, for example.

In this embodiment, the second main groove 4 is formed as a zigzag groove compose of axially outer segments 20, axially inner segments 21 and oblique segments 22.

The axially outer segments 20 and the axially inner segments 21 each extend along the tire circumferential direction. Such axially outer segments 20 and axially inner segments 21 increase the rigidity of the land regions on both sides thereof, and uneven wear resistance is improved.

The axially outer segments 20 and axially inner segments 21 in this embodiment are straight. Thereby, the above-mentioned function is effectively exerted.

In this embodiment, the axially inner segments 21 have a circumferential length Ld, and the axially outer segments 20 have a circumferential length Lc which is different from the circumferential length Ld. Thereby, an increase in resonance sound generated by the axially outer segments 20 and the axially inner segments 21 is suppressed, and the noise performance can be maintained. In order to derive such function more effectively, it is preferred that the absolute value |Ld−Lc| of the difference between the length Ld and the length Lc is set in a range from 1.2 to 1.7 times the maximum groove width W2 of the second main groove 4. Further, in order to further improve the noise performance it is preferred that the ratio |Ld−Lc|/W2 of the second main groove 4, around which a higher ground pressure acts, is set to be more than the ratio |La−Lb|/W1 of the first main groove 3. In this specification, the maximum groove width W2 of the second main groove 4 is the width in the tire axial direction of the axially outer segments 20 and the axially inner segments 21 extending along the tire circumferential direction.

The oblique segments 22 connect between the axially outer segments 20 and the axially inner segments 21 and are inclined with respect to the tire circumferential direction. Such oblique segments 22 effectively disturb and reduce air resonance vibration generated in the second main groove 4. Further, the edges of the oblique segments 22 have an axial component. Accordingly, the oblique segments 22 can improve the noise performance and the on-the-snow traction performance.

The oblique segments 22 are third oblique segments 22A and fourth oblique segments 22B which are alternate in the tire circumferential direction.

The third oblique segments 22A are inclined with respect to the tire circumferential direction to one direction (in FIG. 2, slope down to the left).

The fourth oblique segments 22B are inclined with respect to the tire circumferential direction to an opposite direction to the third oblique segments 22A (in FIG. 2, slope down to the right).

In this embodiment, the third oblique segments 22A have an angle α3 with respect to the tire circumferential direction, and the fourth oblique segments 22B have an angle α4 with respect to the tire circumferential direction which is different from the angle α3. In such oblique segments 22, the third oblique segments 22A having the smaller angle with respect to the tire circumferential direction maintain higher rigidity of the land regions in the vicinities thereof, and at the same time, the fourth oblique segments 22B having the larger angle with respect to the tire circumferential direction effectively reduce the air resonance. Therefore, the uneven wear resistance and the noise performance are further improved. In order to effectively derive such function, it is preferred that the difference between the angle α3 of the third oblique segments 22A and the angle α4 of the fourth oblique segments 22B is set in a range from 10 to 30 degrees, for example.

It is preferable that the ratio V2/W2 of the peak-to-peak amplitude V2 of zigzag of the second main groove 4 to the maximum groove width W2 of the second main groove 4, is more than the ratio V1/W1 of the peak-to-peak amplitude V1 of zigzag of the first main groove 3 to the maximum groove width W1 of the first main groove 3. Thereby, the second main groove 4 around which a higher ground pressure acts can form a more stiff compressed snow block, and can exert a large shearing force of compacted snow. From this standpoint, it is preferable that the peak-to-peak amplitude V2 of zigzag of the second main groove 4 is set in a range from 80% to 100% of the maximum groove width W2 of the second main groove 4.

In this specification, the amplitude V2 is of the widthwise center line 4c of the second main groove 4.

The center line 4j of the amplitude V2 of zigzag of the second main groove 4 is located at a position of from 5.0% to 10.0% of the tread width TW from the tire equator C. Thereby, the rigidity in the tire axial direction of the land regions on both sides of the second main groove 4 can be secured in good balance.

It is not essential but preferable that the maximum groove width W2 of the second main groove 4 is set in a range from 2.0% to 6.0% of the tread width TW.

Further, it is preferable that the groove depth of the second main groove 4 is set in a range from 9.4 mm to about 15.0 mm, for example.

In this embodiment, as shown in FIG. 1, the tread portion 2 is axially divided by the two first main grooves 3 and the two second main grooves 4 into a pair of shoulder land portions 5 between the first main grooves 3 and the tread edges Te, a pair of middle land portions 6 between the first main grooves 3 and the second main grooves 4, and a single center land portion 7 between the second main grooves 4.

Figure 3:
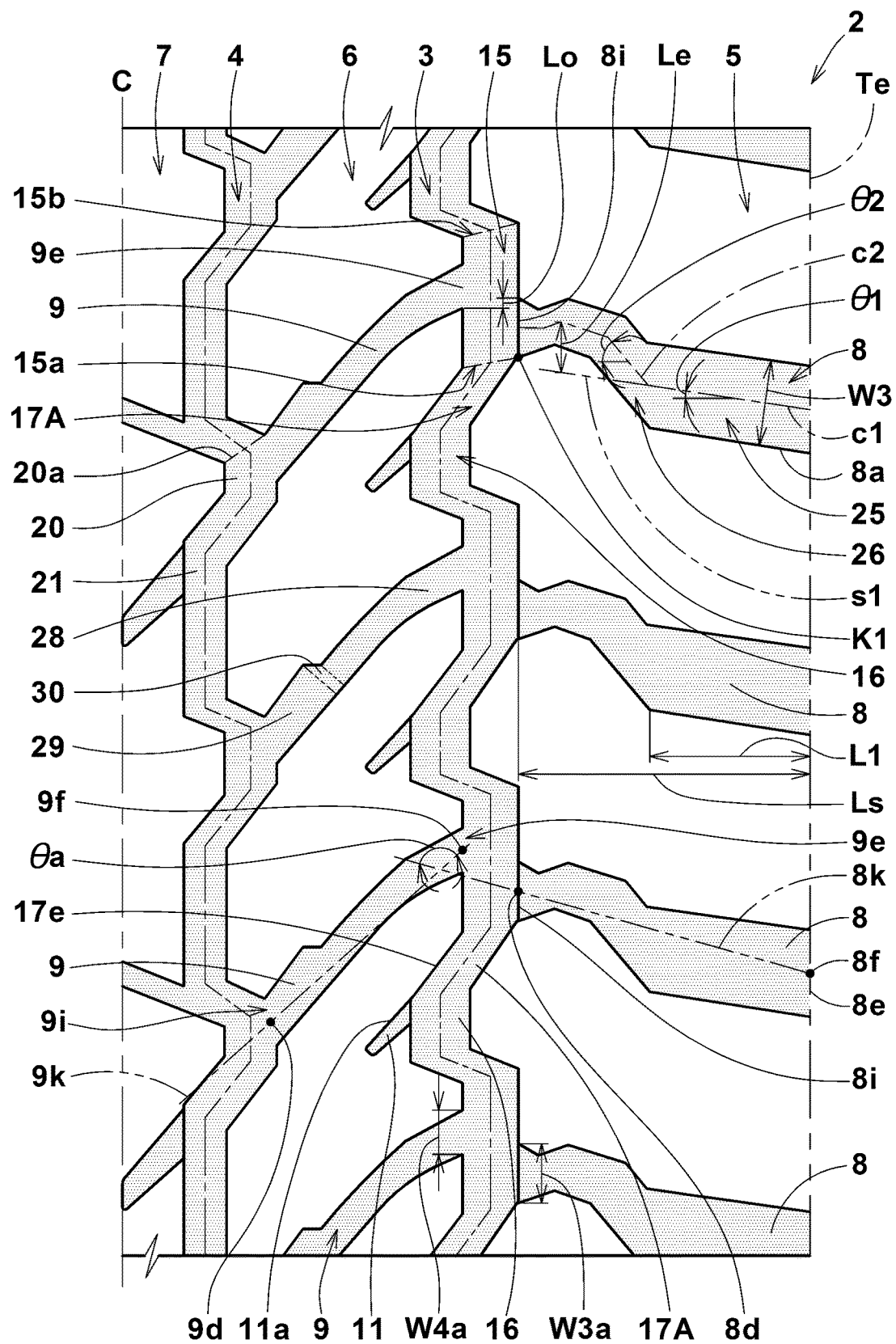
Figure 4:
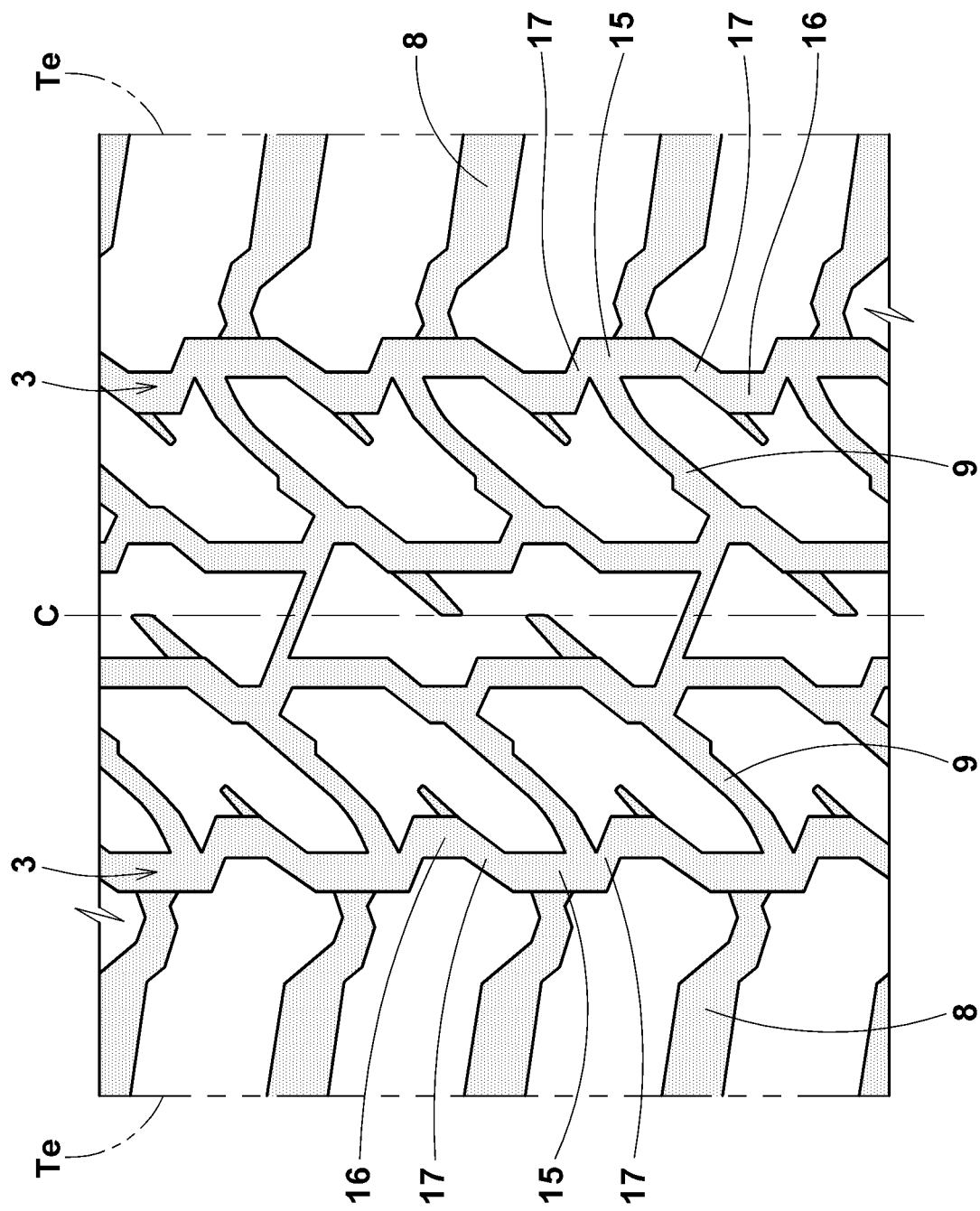
FIG. 4 is a developed partial view of the tread portion of another embodiment of the present invention.
Figure 5:
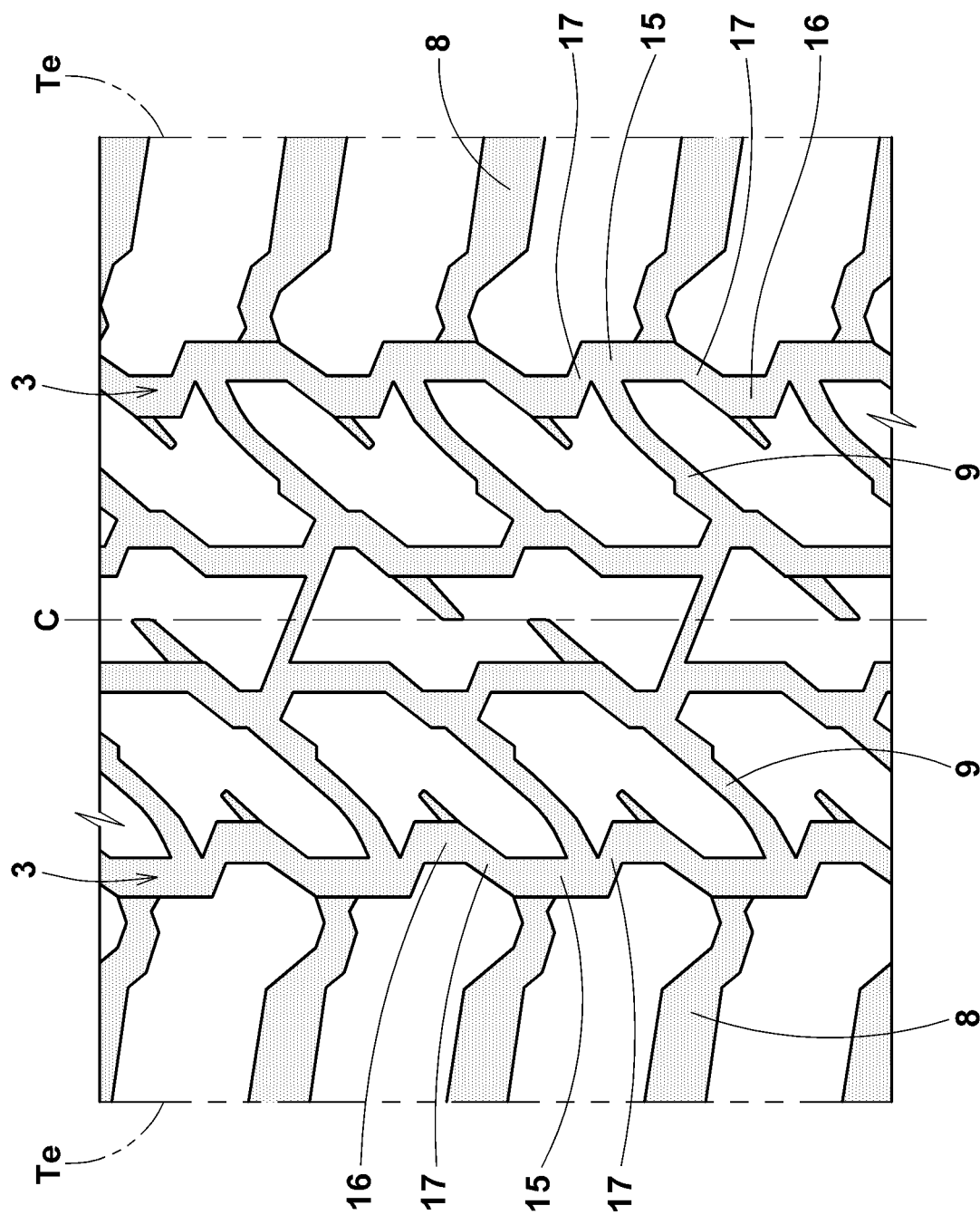
FIG. 5 is a developed partial view of the tread portion of still another embodiment of the present invention.
Figure 6:
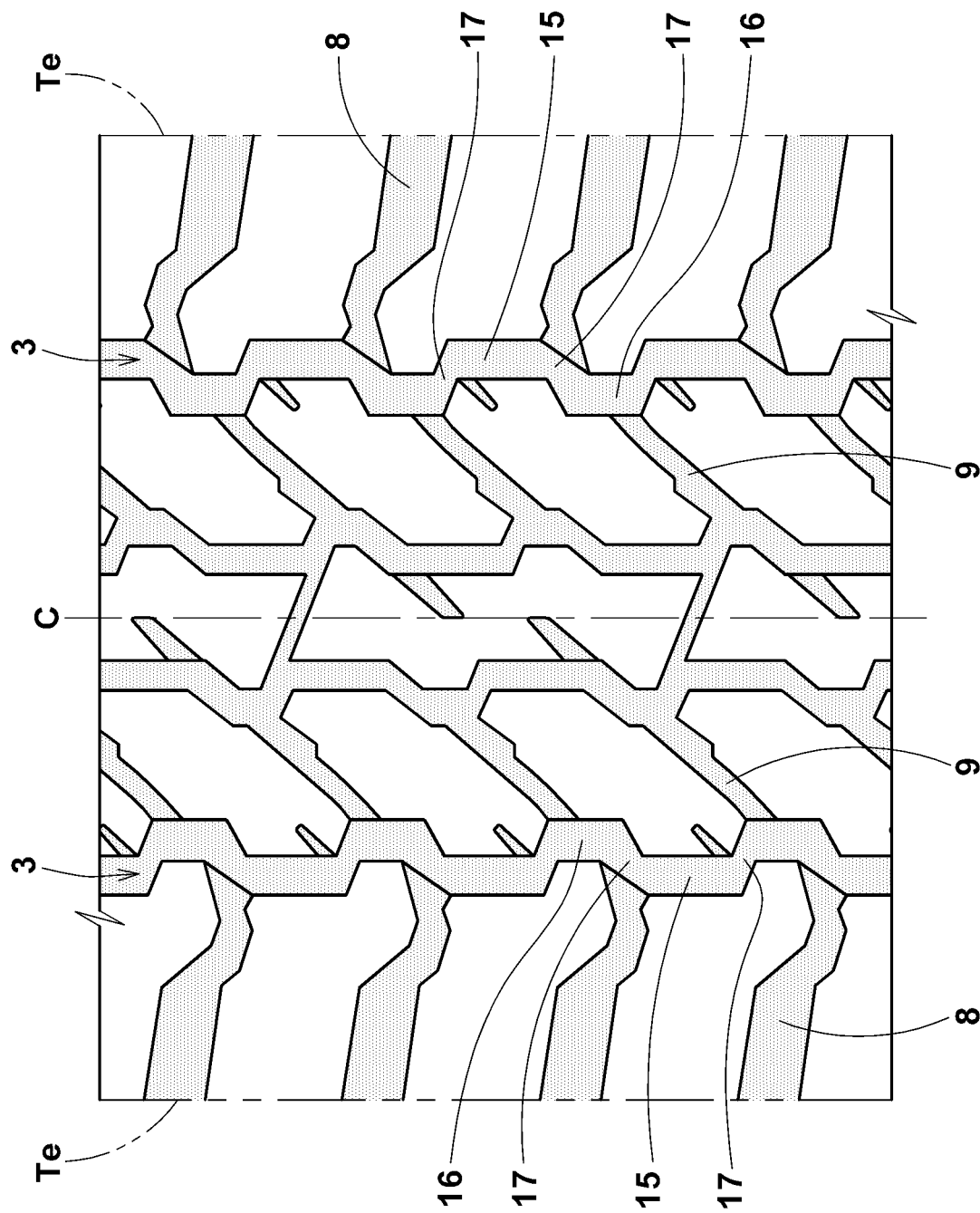
FIG. 6 is a developed partial view of the tread portion of comparative example 1 used in the undermentioned comparison tests.

As shown in FIG. 3, each of the shoulder land portions 5 is provided with a plurality of outward transverse grooves 8 extending axially outwardly from the first main grooves 3.

Such outward transverse grooves 8 each have an axial component, and improve the on-the-snow traction performance.

The outward transverse grooves 8 are respectively connected to the axially outer segments 15. Thereby, in comparison with the outward transverse grooves 8 respectively connected to the axially inner segments 16, the outward transverse groove 8 becomes small with respect to the length in the tire axial direction and the groove volume. As a result, it is possible to reduce the pumping sound generated by the outward transverse grooves 8 which are easier to leak sound outward through the tread edge Te, and impact sound generated by the groove edges. Accordingly, the noise performance is are improved.

The outward transverse groove 8 is connected to the axially outer segment 15 so as to include one end 15a (in FIG. 3, lower end) of the axially outer segment 15. More specifically, one of the groove edges 8a of the outward transverse groove 8 is connected to the intersecting position K1 between the axially outer segment 15 and the first oblique segment 17A. Thereby, the rigidity of the shoulder land portion 5 between the first main groove 3 and the outward transverse grooves 8 can be maintained at high level and the uneven wear resistance is improved.

The outward transverse grooves 8 extend to the adjacent tread edges Te. Such outward transverse grooves 8 can smoothly discharge snow in the transverse grooves 8 through the tread edges Te, and it is possible to further improve the on-the-snow traction performance.

In this embodiment, the outward transverse grooves 8 each comprise a shoulder first part 25 whose groove center line c1 extends at a constant angle θ1 with respect to the tire axial direction, and a shoulder second part 26 whose groove center line c2 extends at an angle θ2 more than the shoulder first part 25. Such outward transverse grooves 8 disturb and reduce the air resonance sound flowing out from the first main groove 3, and reduce noise leaking outward through the tread edges Te. Further, the outward transverse groove 8 is increased in the circumferential component, and the shearing force of compacted snow is increased.
In this specification, the "groove center line" of an axially extending groove is defined by intermediate positions in the tire circumferential direction between groove edges extending in the longitudinal direction of the groove, and
the "groove width" of an axially extending groove is defined by a distance between the groove edges measured perpendicularly to the groove center line.

It is preferable that the maximum length Le in the tire circumferential direction between the groove center line c2 of the shoulder second part 26 and a line s1 extended from the groove center line c1 of the shoulder first part 25 toward the shoulder second part 26 is not less than 30% of the maximum groove width W3 of the outward transverse groove 8.
Thereby, the above described function can be effectively exerted. If the maximum length Le is excessively large, there is a possibility that the rigidity of the shoulder land portion 5 is decreased. Therefore, it is preferable that the maximum length Le is not more than 50% of the maximum groove width W3 of the outward transverse groove 8.

It is preferable for improving the uneven wear resistance and on-the-snow traction performance in good balance that the axial length L1 of the shoulder first part 25 is set in a range from 40% to 60% of the axial length Ls of the outward transverse groove 8.

The middle land portions 6 are each provided with a plurality of inward transverse grooves 9 extending axially inwardly from the adjacent first main groove 3, and a plurality of middle rug grooves 11 extending axially inwardly from the adjacent first main groove 3. Such inward transverse grooves 9 and middle rug grooves 11 each have an axial component, and improve the on-the-snow traction performance.

The inward transverse grooves 9 in this embodiment are respectively connected to the axially outer segments 15. Thereby, in comparison with the inward transverse grooves 9 connected to the axially inner segments 16, the inward transverse grooves 9 formed in the middle land portions 6 on which higher ground pressure acts can be increased in the length in the tire axial direction, and can form stiff compared snow block.

The inward transverse grooves 9 in this embodiment are respectively connected to the axially outer segments 15 to which the transverse grooves 8 are connected. Thereby, the on-the-snow traction performance and the noise performance are significantly improved.

The inward transverse groove 9 in this embodiment is connected to the axially outer segment 15 so as to include none of both ends 15a and 15b of the axially outer segment 15. Thereby, in comparison with the inward transverse groove 9 including one of the ends 15a and 15b of the axially outer segment 15, a part of the middle land portion 6 surrounded by the first main groove 3 and the inward transverse grooves 9, can maintain higher rigidity, and can be provided with excellent uneven wear resistance.

The inward transverse grooves 9 are connected to the second main groove 4. Such inward transverse grooves 9 exert larger on-the-snow traction.

The inward transverse grooves 9 are connected to none of the axially inner segments 21 of the second main groove 4. Thereby, the middle land portions 6 can maintain higher rigidity in the vicinities of the axially inner segments 21 of the second main grooves 4 in which a higher ground pressure acts, and the uneven wear resistance is further improved. The inward transverse grooves 9 in this embodiment are connected so as to respectively include the ends 20a of the axially outer segments 20 of the second main grooves 4.

In this embodiment, the axially outer ends 9e of the inward transverse grooves 9 are respectively overlapped in the tire circumferential direction with the axially inner ends 8i of the outward transverse grooves 8. Thereby, the air resonance sound in the first main groove 3 is flowed to the outward transverse grooves 8 and the inward transverse grooves 9 in good balance, and disturbed. Thus, it is possible to effectively prevent the generation of the noise.
If the overlap lengths L0 in the tire circumferential direction of the axially outer ends 9e of the inward transverse grooves 9 with the axially inner ends 8i of the outward transverse grooves 8, are small, the rigidity of the land regions is greatly decreased in the vicinities of the axially outer segments 15 to which the inward transverse grooves 9 and the outward transverse grooves 8 are connected. Therefore, it is preferable that the overlap lengths L0 in the tire circumferential direction between the axially outer ends 9e of the inward transverse grooves 9 and the axially inner ends 8i of the outward transverse grooves 8 are set in a range from 15% to 25% of the maximum groove width W1 of the first main groove 3.

It is preferable that the inward transverse grooves 9 are inclined to an opposite direction to the outward transverse grooves 8, and that the intersecting angles θa of the inward transverse grooves 9 with outward transverse grooves 8 are in a range from 120 to 140 degrees.

If the intersecting angles θa are less than 120 degrees, the rigidities of corners of the shoulder land portions 5 and middle land portions 6 formed between the first main groove 3 and the outward/inward transverse grooves 8/9 are decreased, and there is a possibility that the uneven wear resistance is deteriorated. If the intersecting angles θa are more than 140 degrees, then the length of the groove edges of the inward transverse grooves 9 and outward transverse grooves 8 which edges simultaneously contact with the ground, becomes increased, and there is a possibility that the impact sound generated by the groove edges of the transverse grooves 8 and 9 and the pumping sound are increased. Here, the intersecting angle θa is of an imaginary groove center line 9$k$ of the inward transverse groove 9 and an imaginary groove center line 8$k$ of the outward transverse groove 8, wherein the imaginary groove center line 9$k$ of the inward transverse grooves 9 is a straight line passing through the intermediate position 9*d* in the tire circumferential direction of the axially inner end 9*i* of the inward transverse groove 9 and the intermediate position 9*f* in the tire circumferential direction of the axially outer end 9*e* of the inward transverse groove 9, and the imaginary groove center line 8$k$ of the outward transverse grooves 8 is a straight line passing through the intermediate position 8*d* in the tire circumferential direction of the axially inner end 8*i* of the outward transverse groove 8 and the intermediate position 8*f* in the tire circumferential direction of the outer end 8*e* of the outward transverse groove 8.

The inward transverse grooves 9 in this embodiment each comprise a first transverse groove part 28 and a second transverse groove part 29. The first transverse groove part 28 is connected to the first main groove 3. The second transverse groove part 29 is connected to the second main groove 4. The second transverse groove part 29 has a groove width more than the width of the first transverse groove part 28. The second transverse groove part 29 is provided with a widening part 30 whose groove width is increased from the first transverse groove part 28 to the second transverse groove part 29. Namely, the inward transverse groove 9 is provided with the wider second transverse groove part 29 in a tire-equator-c-side on which a higher ground pressure acts, therefore, it is possible to form more stiff compacted snow block.

Further, the inward transverse groove 9 is provided with the narrower first transverse groove part 28 in an axially outer side, and suppresses the decrease in the rigidity of the middle land portion 6, therefore, the uneven wear resistance can be maintained at high level.

It is preferable that the groove width W4*a* at the axially outer end 9*e* of the inward transverse groove 9 is less than the groove width W3*a* at the axially inner end 8*i* of the outward transverse groove 8. Thereby, the snow in the first main groove 3 becomes easily discharged outward of the tread edge Te, and the rigidity of the middle land portion 6 on which a higher ground pressure than the shoulder land portion 5 acts can be maintained at high level, Therefore, the on-the-snow traction performance and the uneven wear resistance can be improved in good balance.

In this specification, the groove width at axially outer/inner end of a groove is a width measured along the tire circumferential direction.

The middle rug grooves 11 in this embodiment are respectively connected to the axially inner segments 16 of the first main groove 3.

In this embodiment, one of the groove edges 11*a* of the middle rug groove 11 is smoothly connected to the groove edge 17*e* of the oblique segment 17 (in the figures, first oblique segment 17A) of the first main groove 3 as shown in FIG. 3 so that the middle rug groove 11 and the first oblique segment 17A are configured like a single groove, therefore, the on-the-snow traction performance can be further improved.

The groove width of the middle rug groove 11 in this embodiment is gradually increased toward the axially inner segment 16. Such middle rug groove 11 can smoothly discharge the snow therein toward the oblique segment 17.

The center land portion 7 in this embodiment is, as shown in FIG. 1, provided with a plurality of center transverse grooves 10 connecting between the second main grooves 4, and a plurality of center rug grooves 12 extending from the second main grooves 4 toward the tire equator c and terminating within the center land portion 7.

The center transverse grooves 10 and the center rug grooves 12 each have an axial component, and improve the on-the-snow traction performance.

The center transverse grooves 10 respectively connect the oblique segments 22 of one of the second main grooves 4 with those of the other second main groove 4. More specifically, in each of the transverse grooves 10 in this embodiment, one groove edge 10*a* is aligned with and smoothly connected to the groove edge 22*e* of the oblique segment 22 of one of the second main grooves 4 (in the figures, right side), and the other groove edge 10*b* is aligned with and smoothly connected to the groove edge 22*e* of the oblique segment 22 of the other second main groove 4 (in the figures, left side). Thereby, the center transverse groove 10 and the oblique segments 22 are configured like a single groove smoothly extending in one direction. Thereby, a large shearing force of compacted snow is exerted.

In this embodiment, the groove edges 10*a* and 10*b* of the center transverse groove 10 and the groove edges 22*e* of the two oblique segments 22 are straight.

The center rug grooves 12 in this embodiment extend along the third oblique segments 22A of the second main groove 4 so that each of the center rug grooves 12 and one of the third oblique segments 22A form a smoothly exerting single groove. Thus, a larger shearing force of compacted snow can be exerted.

It is preferable that the groove width W7 of the center rug grooves 12 is more than the groove width w5 of the middle rug grooves 11. Thus, larger sized stiff compacted snow blocks can be formed by the center rug grooves 12 provided in the center land portion 7 on which a higher ground pressure acts, and excellent on-the-snow traction performance can be obtained. From this standpoint, it is preferred that the width W7 of the center rug grooves 12 is set in a range from 1.3 to 2.0 times the groove width w5 of the middle rug grooves 11.

While detailed description has been made of an embodiment of the present invention, the present invention can be embodied in various forms without being limited to the illustrated embodiment.

Comparison Tests

Based on the tread pattern shown in FIG. 1, pneumatic tires of size 265/70R17 (rim size 17×7.5J) having specifications listed in Table 1 were experimentally manufactured and tested for steering stability and noise performance (tire pressure 240 kPa).

Specifications common to the test tires, namely, working examples Ex.1-Ex.15 and Comparative example Ref.1 and Ref.2 are as follows:
first main groove depth: 10.4 mm
second main groove depth: 10.4 mm
outward transverse groove depth: 10.4 mm
inward transverse groove depth: 10.4 mm
<On-the-Snow Traction Performance Test>

A 4300cc 4WD passenger car provided on the four wheels with the test tires was run on a road surface covered with trodden snow in a test course, and the running distance required to accelerate the speed from 10 km/h to 35 km/h was measured. The results are indicated in Table 1 by an index based on the comparative example 1 being 100, wherein the larger the value, the better the performance.
<Noise Performance Test>

The test car was run on a dry asphalt road surface, and the noise heard in the interior of the test car at the speed of from 60 to 100 km/h was evaluated by the test driver. The results are indicated in Table 1 by an index based on comparative example 1 being 100, wherein the larger the value, the better the performance.
<Uneven Wear Resistance Test>

After running on a dry asphalt road for 20000 km, each test tire was measured for uneven wear (heel and toe wear), namely. the difference in wear between the toe-side edge and heel-side edge of each of the shoulder blocks and middle blocks at circumferentially different five measuring positions to obtain a mean value of the differences.
The results are indicated in Table 1, wherein the smaller the value, the better the uneven wear.

17 oblique segments
C tire equator
Te tread edge

The invention claimed is:

1. A tire comprising a tread portion provided with
a first main groove disposed between the tire equator and one of tread edges and extending continuously in the tire circumferential direction,
a plurality of outward transverse grooves extending axially outwardly from the first main groove, and
a plurality of inward transverse grooves extending axially inwardly from the first main groove,
wherein
the first main groove is a zigzag groove comprising
a plurality of axially outer segments extending along the tire circumferential direction,
a plurality of axially inner segments extending along the tire circumferential direction and positioned axially inside the axially outer segments, and
a plurality of oblique segments linking the axially outer segments and the axially inner segments and inclined with respect to the tire circumferential direction,
each of the axially outer segments is connected with one of the outward transverse grooves and one of the inward transverse grooves,
each of the outward transverse grooves is connected to one of the axially outer segments so as to include one end of the axially outer segment, and each of the inward transverse grooves is connected to one of the axially outer segments so as to include neither one end nor the other end of the axially outer segment,

TABLE 1

| Tire | Ref. 1 | Ref. 2 | Ex. 1 | Ex. 2 | Ex. 3 | Ex. 4 | Ex. 5 | Ex. 6 | Ex. 7 |
|---|---|---|---|---|---|---|---|---|---|
| tread portion (FIG. No.) | 6 | 7 | 1 | 1 | 1 | 1 | 1 | 1 | 1 |
| first main groove amplitude V1/W1 (%) | 80 | 80 | 80 | 60 | 70 | 90 | 100 | 80 | 80 |
| intersecting angle θa between outward and inward transverse grooves (deg.) | 130 | 130 | 130 | 130 | 130 | 130 | 130 | 110 | 120 |
| shoulder second part maximum length Le/W3 (%) | 40 | 40 | 40 | 40 | 40 | 40 | 40 | 40 | 40 |
| on-the-snow traction performance | 100 | 100 | 110 | 107 | 109 | 111 | 112 | 112 | 111 |
| noise performance | 100 | 104 | 110 | 108 | 109 | 110 | 111 | 111 | 110 |
| uneven wear resistance | 3.0 | 2.7 | 1.5 | 1.3 | 1.4 | 1.6 | 1.8 | 1.6 | 1.6 |

| Tire | Ex. 8 | Ex. 9 | Ex. 10 | Ex. 11 | Ex. 12 | Ex. 13 | Ex. 14 | Ex. 15 |
|---|---|---|---|---|---|---|---|---|
| tread portion (FIG. No.) | 1 | 1 | 1 | 1 | 1 | 1 | 4 | 5 |
| first main groove amplitude V1/W1 (%) | 80 | 80 | 80 | 80 | 80 | 80 | 80 | 80 |
| intersecting angle θa between outward and inward transverse grooves (deg.) | 140 | 150 | 130 | 130 | 130 | 130 | 130 | 130 |
| shoulder second part maximum length Le/W3 (%) | 40 | 40 | 20 | 30 | 50 | 60 | 40 | 40 |
| on-the-snow traction performance | 109 | 108 | 108 | 109 | 111 | 112 | 110 | 111 |
| noise performance | 109 | 107 | 108 | 109 | 110 | 111 | 110 | 108 |
| uneven wear resistance | 1.4 | 1.4 | 1.4 | 1.5 | 1.6 | 1.7 | 1.7 | 1.7 |

From the test results, it was confirmed that working examples were improved in the on-the-snow traction performance, noise performance and uneven wear resistance in good balance as compared with comparative examples.

REFERENCE SIGNS LIST 1 tire
2 tread portion
3 first main groove
8 outward transverse grooves
9 inward transverse grooves
15 axially outer segments
16 axially inner segments in the tire circumferential direction, axially inner ends of the outward transverse grooves connected to the first main groove are respectively overlapped with axially outer ends of the inward transverse grooves connected to the first main groove, and
a groove width of each of the plurality of inward transverse grooves at the axially outer end thereof is less than a groove width of each of the plurality of outward transverse grooves at the axially inner end thereof.

2. The tire according to claim 1, wherein
the outward transverse grooves are inclined oppositely to the inward transverse grooves, so that an intersecting angle between the outward transverse groove and the inward transverse groove is in a range from 120 to 140 degrees.

3. The tire according to claim 1, wherein
the first main groove is the axially outermost groove which extends continuously in the tire circumferential direction, and
the center line of the amplitude of zigzag of the first main groove is at a position of from 22.5% to 27.5% of the tread width from the tire equator.

4. The tire according to claim 1, wherein
the peak-to-peak amplitude of zigzag of the first main groove is in a range from 70% to 90% of the maximum groove width of the first main groove.

5. The tire according to claim 1, wherein
the tread portion is provided on the axially inside of the first main groove with a second main groove extending continuously in the tire circumferential direction,
axially inner ends of the inward transverse grooves are connected to the second main groove,
the outward transverse grooves extend to the tread edge, and
the outward transverse grooves and the inward transverse grooves are not connected to axially inner segments of the second main groove.

6. The tire according to claim 2, wherein
the first main groove is the axially outermost groove which extends continuously in the tire circumferential direction, and
the center line of the amplitude of zigzag of the first main groove is at a position of from 22.5% to 27.5% of the tread width from the tire equator.

7. The tire according to claim 2, wherein
the peak-to-peak amplitude of zigzag of the first main groove is in a range from 70% to 90% of the maximum groove width of the first main groove.

8. A tire comprising:
a tread portion provided with a first main groove disposed between the tire equator and one of tread edges and extending continuously in the tire circumferential direction, a plurality of outward transverse grooves extending axially outwardly from the first main groove, and a plurality of inward transverse grooves extending axially inwardly from the first main groove,
wherein the first main groove is a zigzag groove comprising a plurality of axially outer segments extending along the tire circumferential direction, a plurality of axially inner segments extending along the tire circumferential direction and positioned axially inside the axially outer segments, and a plurality of oblique segments linking the axially outer segments and the axially inner segments and inclined with respect to the tire circumferential direction, and each of the axially outer segments is connected with one of the outward transverse grooves and one of the inward transverse grooves,
wherein each of the outward transverse grooves is connected to one of the axially outer segments so as to include one end of the axially outer segment, and each of the inward transverse grooves is connected to one of the axially outer segments so as to include neither one end nor the other end of the axially outer segment, and
wherein the outward transverse grooves are inclined oppositely to the inward transverse grooves, so that an intersecting angle between the outward transverse groove and the inward transverse groove is in a range from 120 to 140 degrees.

9. A tire comprising:
a tread portion provided with a first main groove disposed between the tire equator and one of tread edges and extending continuously in the tire circumferential direction, a plurality of outward transverse grooves extending axially outwardly from the first main groove, and a plurality of inward transverse grooves extending axially inwardly from the first main groove,
wherein the first main groove is a zigzag groove comprising a plurality of axially outer segments extending along the tire circumferential direction, a plurality of axially inner segments extending along the tire circumferential direction and positioned axially inside the axially outer segments, and a plurality of oblique segments linking the axially outer segments and the axially inner segments and inclined with respect to the tire circumferential direction, and each of the axially outer segments is connected with one of the outward transverse grooves and one of the inward transverse grooves,
wherein each of the outward transverse grooves is connected to one of the axially outer segments so as to include one end of the axially outer segment, and each of the inward transverse grooves is connected to one of the axially outer segments so as to include neither one end nor the other end of the axially outer segment, and
wherein the peak-to-peak amplitude of zigzag of the first main groove is in a range from 70% to 90% of the maximum groove width of the first main groove.

* * * * *